(12) United States Patent
Looney

(10) Patent No.: US 9,241,447 B2
(45) Date of Patent: Jan. 26, 2016

(54) COVERING MECHANISM FOR A COLD FRAME

(71) Applicant: Donald F. Looney, Columbia, SC (US)

(72) Inventor: Donald F. Looney, Columbia, SC (US)

( * ) Notice: Subject to any disclaimer, the term of this patent is extended or adjusted under 35 U.S.C. 154(b) by 0 days.

(21) Appl. No.: 14/527,969

(22) Filed: Oct. 30, 2014

(65) Prior Publication Data

US 2015/0121750 A1 May 7, 2015

Related U.S. Application Data

(60) Provisional application No. 61/899,542, filed on Nov. 4, 2013, provisional application No. 61/900,530, filed on Nov. 6, 2013.

(51) Int. Cl.
*A01G 9/24* (2006.01)
*A01G 13/00* (2006.01)

(52) U.S. Cl.
CPC ............ *A01G 9/242* (2013.01); *A01G 13/0231* (2013.01)

(58) Field of Classification Search
CPC ............................ A01G 9/242; A01G 13/0206
USPC .......................................................... 47/19.2
See application file for complete search history.

(56) References Cited

U.S. PATENT DOCUMENTS

| | | | | |
|---|---|---|---|---|
| 2,777,253 A * | 1/1957 | Bensin | ................... | A01G 7/045 126/621 |
| 3,206,892 A * | 9/1965 | Telkes | ..................... | A01G 9/20 47/19.1 |
| 3,874,114 A * | 4/1975 | Rowell | ................... | A01G 13/04 454/278 |
| 3,946,521 A * | 3/1976 | Ours | ...................... | A01G 9/241 236/101 R |
| 4,249,340 A * | 2/1981 | Maes, Jr. | ................ | A01G 9/243 47/17 |
| 4,852,298 A * | 8/1989 | Markos | .................... | A01G 9/16 47/17 |
| 5,060,415 A * | 10/1991 | Schleip | ................... | A01G 9/16 47/19.2 |
| 6,260,308 B1 | 7/2001 | Looney | | |
| 7,739,831 B2 * | 6/2010 | Frounfelker | .......... | A01G 13/04 47/19.2 |
| 2014/0013662 A1 * | 1/2014 | Wuster | ..................... | A01G 9/24 47/19.2 |

FOREIGN PATENT DOCUMENTS

FR 2668195 A1 * 4/1992 ............ A01G 9/242

* cited by examiner

*Primary Examiner* — Rob Swiatek
*Assistant Examiner* — Ebony Evans
(74) *Attorney, Agent, or Firm* — Michael A. Mann; Nexsen Pruet, LLC

(57) ABSTRACT

A mechanism for covering and uncovering a cold frame includes a starting base and a spaced-apart terminal base, a frame, and a cover deployable over the frame starting at the starting base and ending at the terminal base. The cover is wrapped from its midline around a cover shaft rotated by a first drive motor, as cables, attached to the leading edge of the cover, pull it over the frame. Those cables are simultaneously winding themselves around a cable shaft rotated by a second drive motor so that cover remains tight between the cable shaft and the cover shaft. The other end of the cables is secured to the starting base while the trailing edge of the cover is secured to the terminal base. Torque arms extend from the first and second drive motors and their distal ends are pivotally connected.

21 Claims, 4 Drawing Sheets

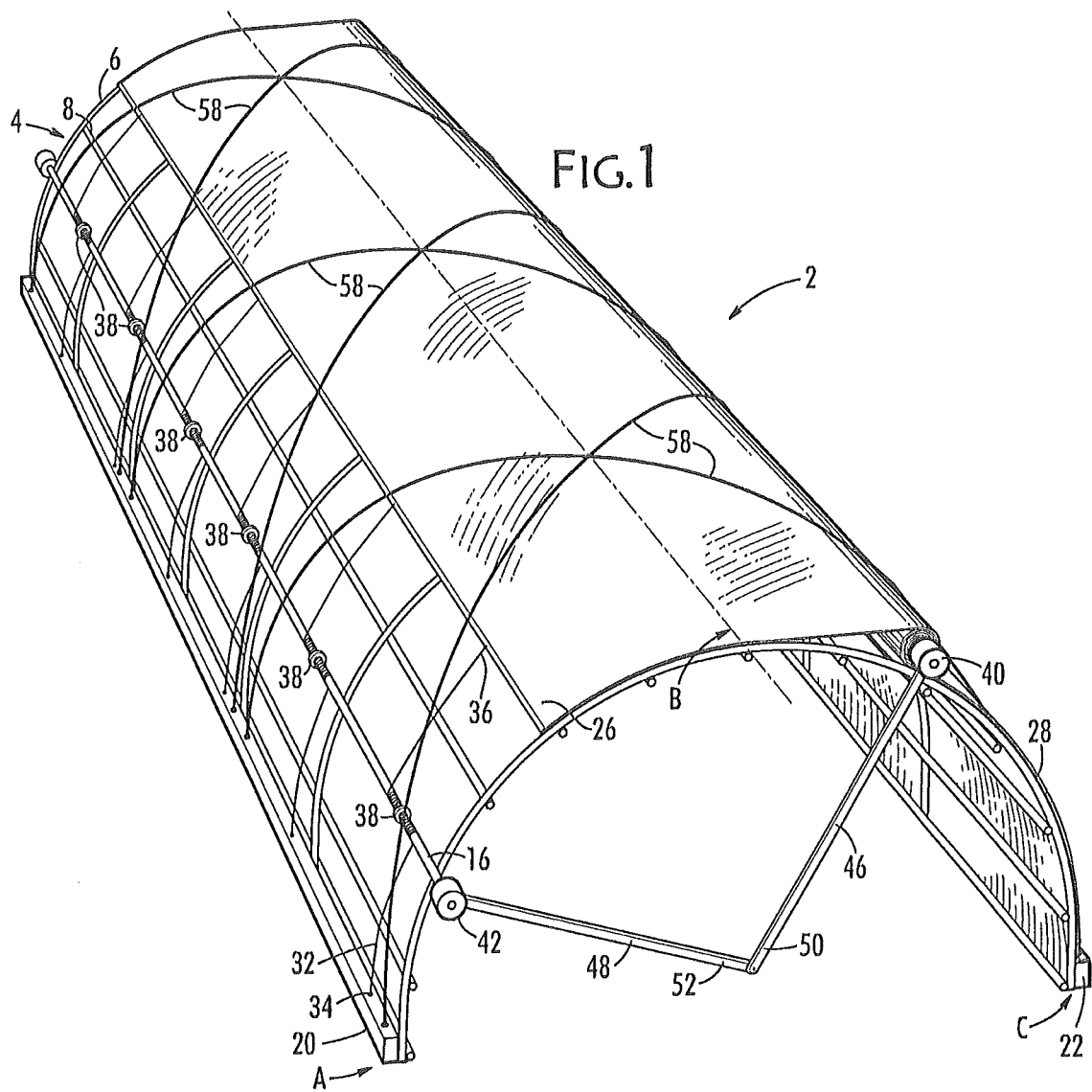

COVERING MECHANISM FOR A COLD FRAME

CROSS REFERENCE TO RELATED APPLICATIONS

None.

STATEMENT REGARDING FEDERALLY SPONSORED RESEARCH OR DEVELOPMENT

Not applicable.

REFERENCE TO A SEQUENCE LISTING, A TABLE, OR A COMPUTER PROGRAM LISTING COMPACT DISC APPENDIX

Not Applicable.

BACKGROUND OF THE INVENTION

The present invention relates generally to cold frames. More specifically, the present invention relates to devices that allow the user to cover and uncover a cold frame at will.

A cold frame is a lightweight enclosure that provides covering for plants and seedlings, whether planted in flowerpots or trays or in the earth enclosed by the cold frame. Typically, a cold frame comprises a framework and a covering. The framework can be made of metal, wood or plastic; and the covering is typically made of plastic sheeting (e.g., transparent polyethylene). Invariably, the covering is light-transmitting although not necessarily light transparent and is most often "fixed"; that is, it remains in place and is not easily openable or removable. For ventilation, holes can be cut in the plastic or the sides can be lifted.

The purpose of the cold frame is to protect the plants and seedlings from the extremes of the environment: cold, wind, or excessive amounts of rain or "hard" rains. However, cold frames can also cause problems for growing plants. They trap heat, for example. Also, because plants naturally grow toward the light—a tendency known as phototropism—and because cold frame coverings invariably attenuate the light, plants in cold frames can tend to be spindly.

Ideally, cold frames should have a cover that can be opened when the weather is clear and warm, and that can be closed on nights when the temperature is expected to drop to unacceptably low levels, or on days when it will rain excessively or rain hard, or when too much heat has built up in the cold frame. Such a cover would not only help to regulate the temperature within the cold frame, but would reduce watering costs and make plants healthier, thicker and fuller.

Cold frames can be uncovered and recovered manually, of course, but the cost, time and labor associated with uncovering and recovering manually makes it impractical to do so frequently. For example, it may take a team of two to six men several hours to cover or uncover a typical cold frame. Some commercial farms may have hundreds of cold frames at a single growing site. Moreover, when a cold frame is uncovered and the plastic is removed, the plastic often is abraded, pierced, and/or torn such that it cannot be used again. Moreover, it is usually dirty and wrinkled making it unfit for reuse and very difficult to fold or roll for storage.

Accordingly, every year, millions of pounds of plastic is purchased at enormous expense to cover cold frames. Once the plastic has been used (e.g., one growing season for 4 mil polyethylene), it must be disposed of in landfills or recycled. The plastic is enormously bulky and many landfills are reluctant, or refuse, to accept it. Furthermore, when the plastic is recycled, it cannot be made into covering again because the recycled plastic does not have the required transparency and toughness.

In short, it is simply impractical to cover and uncover the cold frames. Leaving the cold frame covered when no cover is needed, however, can be harmful both to the plants (overheating) and to the plastic as well. Polyethylene and many other plastics deteriorate when exposed to UV radiation. Having the covering exposed to sunlight unnecessarily, for example on warm fall, spring, or summer days, needlessly degrades the covering. Accordingly, the need exists for a system that quickly, efficiently, and reliably uncovers and recovers a cold frame without damaging the plastic covering.

Moreover, a system for uncovering a cold frame must be simple structurally so that it is not cost prohibitive. It must be easy to use so that cold frames can be uncovered and covered quickly and without special training. Commercial growers may use dozens or hundreds of cold frames. If the closure mechanism is too complicated or slow, operating it may require extensive manpower or time or both. Finally, the covering mechanism must accommodate the characteristics of plastic. These characteristics include (1) the tendency to "bathtub" or collect water where the plastic sags, (2) the tendency to catch the wind and (3) the tendency to tear or rip if mishandled.

However, the advantages of a system that can meet this requirement are considerable. An inexpensive, easy-to-use and reliable system for covering and uncovering the cold frame can make growing of plants much easier and result in higher quality plants, better yields and lower costs. Moreover, such a system is not limited to use on small plants. Cold frames can also be constructed over trees in an orchard. For example, cherry trees, which are extremely sensitive to rain during the roughly two-week period before harvesting, could be covered with cold frames during that specific period of time, and uncovered the rest of the time. Temporary structures for out-of-door events can also benefit from such a mechanism.

There remains a need for a covering mechanism for cold frames that operates easily and simply and does not add unduly to the overall cost of cold frame construction.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present concepts of the invention in a simplified form as a prelude to the more detailed description that is presented later.

According to its major aspects and briefly stated, the present invention is a mechanism for covering and uncovering a cold frame. The mechanism allows the user to remove the cover of a cold frame, from the base of one side of the arch (the "starting base"), over the peak of the cold frame to the base of the other side of the arch (the "terminal base"), and to cover the cold frame in the same way but in the reverse direction (from terminal base to starting base), all the while keeping tension on the covering material so it remains properly positioned and is rolled and unrolled in an orderly fashion with suitable tension to limit wrinkles, tears, or wear.

Putting its operation simply, to open a cold frame completely using the present covering mechanism, the user drives a rotating shaft that runs from a point approximately midway between the starting base of the cold frame and the terminal base. The rotating shaft can be longer than the cold frame in the axial direction, extending slightly beyond the cold frame on both ends.

As the cover shaft rolls from the mid-point or peak of the cold frame down to the terminal side, it rolls up the cold frame cover around itself. As the cover shaft rolls, it draws the trailing portion of the cover toward it as it also pulls up the portion of the cover it is rolling over, effectively folding the cover in half in a two-layer spiral around it. Meanwhile, a cable shaft, also motor driven, unwinds plural cables, each of which is tied on one end to the trailing edge of the cover and, on the other end, to the starting base to thereby act as a drag or brake to the cover shaft to keep tension on the cover as it is rolled up. The user can use any means of driving the cover shaft and cable shaft known in the art, such as an electric motor and reduction gearbox. Alternatively, the cover shaft and cable shaft could be driven pneumatically or hydraulically. The cover shaft and cable shaft are not rigidly fixed to the cold frame.

On the terminal base, the edge of plastic is permanently affixed to the terminal base. On the starting base, the cables are affixed. Accordingly, when the cover shaft is driven to open the cold frame, the cover shaft wraps the plastic from both sides around itself and moves toward the terminal base. When the cold frame is fully opened, all of the plastic is wound around the cover shaft and the cover shaft is located at the terminal base and the cable shaft is located approximately at the mid-point between the starting base and the terminal base. Similarly, when the cold frame is fully closed, the cables are fully wound around the cable shaft and the cable shaft is located at the starting base and the cover shaft is located approximately at the mid-point The lead edge of the cover is fixed to a lead shaft that extends the length of the cold frame. When the cold frame is opening, the lead shaft slides from the starting base to the terminal base (i.e. over the entire cold frame). Note that the lead shaft travels the full arc of the cold frame while the cover shaft and cable shaft travel half way each.

Attached to the lead shaft and running perpendicular to it are a series of lateral cables. Alternatively, the lateral cables can be attached directly to the leading edge of the covering. The lateral cables extend from the lead shaft to and around a tension shaft, which is parallel to the lead shaft. The tension shaft runs the length of the cold frame (and can extend beyond the edge of the cold frame at both ends), and is located at the base of the starting side of the cold frame. The tension shaft, unlike the cover shaft, is rigidly fixed (but free to rotate) at the starting base.

The organized and uniform nature of the opening and closing of the covering also results in a dramatically extended useful life for the plastic covering. For example, the covering most commonly used today to cover cold frames is 4 mil polyethylene. This particular thickness of polyethylene is commonly referred to as "one-year film," reflecting roughly how long it can be expected to last if it is used on a cold frame for one season (i.e. applied in the fall and removed in the spring). Using the system of the present invention, the plastic can be rolled up neatly and quickly when unneeded to avoid undue exposure to sunlight, which degrades the plastic. Accordingly, a feature of the present invention is that the life of the plastic covering can be dramatically extended. For example, because the plastic used in the present invention receives much less sun exposure, its useful life can be extended to two or three times the typical useful life, or more. In addition, because the plastic used with the present invention is spared much of the sun exposure and abrasion the plastic on a manually covered and uncovered cold frame experiences, it is practical to use the thicker, more expensive 6 mil film. Six mil film, commonly called "four-year film" because it is expected to last approximately four seasons on a conventional greenhouse where it is continually exposed to the sun, could last two to three times the expected life with the present invention, especially if the plastic is shielded from the sun when it is stored on the terminal side.

Another feature of the present invention is that the covering can be easily opened partially to allow ventilation, while at the same time remain under tension. Partially uncovering the cold frame permits the cold frame to be ventilated, a feature that is important, for example, during unusually warm days in fall or early spring. Likewise, when temperatures are expected to drop to a degree that can be harmful to the plants in the cold frame, the cold frame can be quickly and easily closed.

Other features and advantages of the present invention will be apparent to those skilled in the art from a careful reading of the Detailed Disclosure of the Preferred Embodiment presented below and accompanied by the drawings.

BRIEF DESCRIPTION OF THE DRAWINGS

In the drawings:

FIG. 1 is a perspective view of the present cold frame closing mechanism from the driving end of the cold frame.

DETAILED DESCRIPTION OF THE PREFERRED EMBODIMENT

As described in summary form above, this invention relates to a covering mechanism for a cold frame, Although described in terms of its use with a cold frame, it will be clear that the covering mechanism can be used with other temporary or semi-permanent enclosures with little or no modification.

A cold frame is essentially a rounded structure, roughly forming a flattened half cylinder, made by combining a series of bowed members and purlins together to form a simple frame. The frame elements are typically made of tubular metal such as aluminum, and support a flexible, light-transmitting covering. The frame gives the cold frame its characteristic shape and serves to define the roof and walls of the cold frame. The bowed members, which are affixed at their bases to a foundation, and purlins, are further supported at the ends of the cold frame by vertical end members.

Figure 2A:
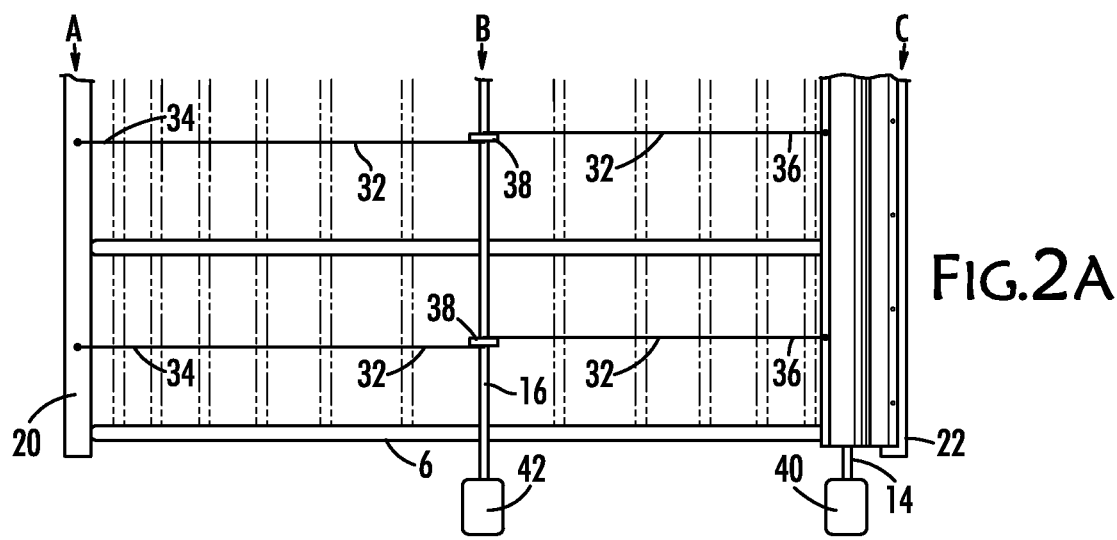
FIGS. 2A, 2B, and 2C are top views of the closing mechanism for the cold frame showing the cold frame in three positions: uncovered, halfway closed and closed.
Figure 2B:
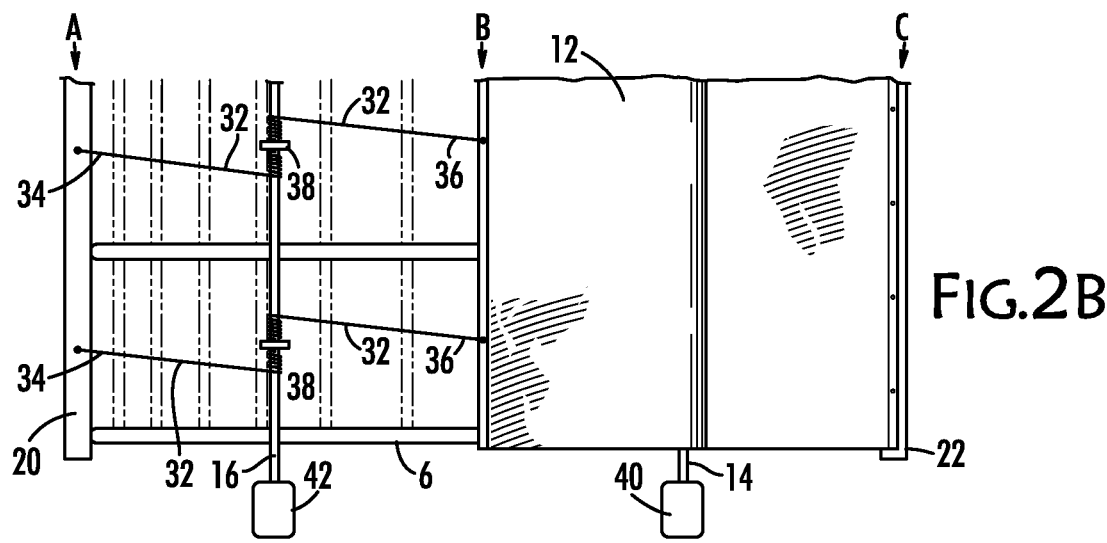
Figure 2C:
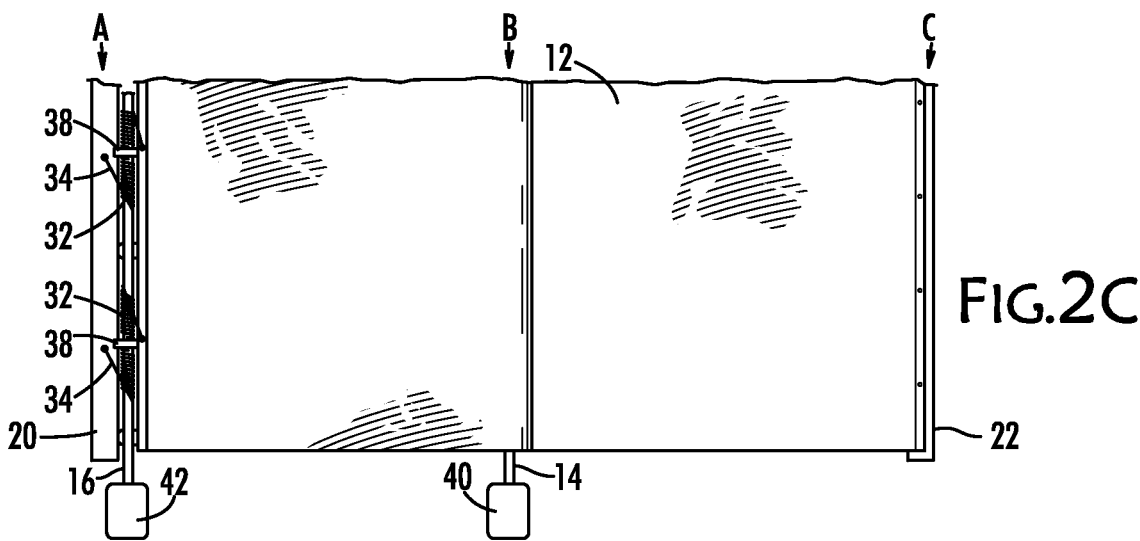
Figure 3A:
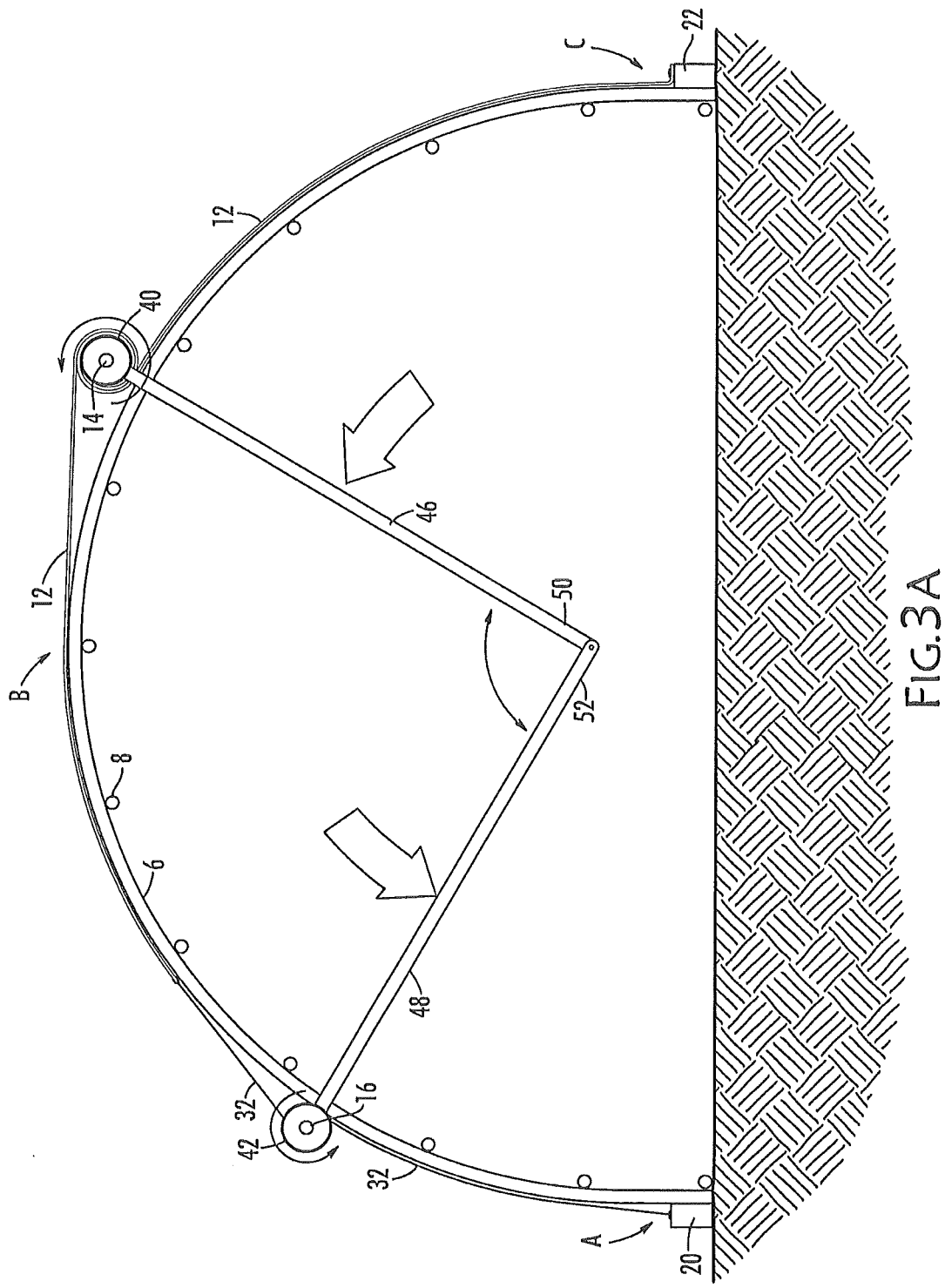
FIGS. 3A and 3B are side views of the closing mechanism for the cold frame showing the cold frame in two partially uncovered stages.
Figure 3B:
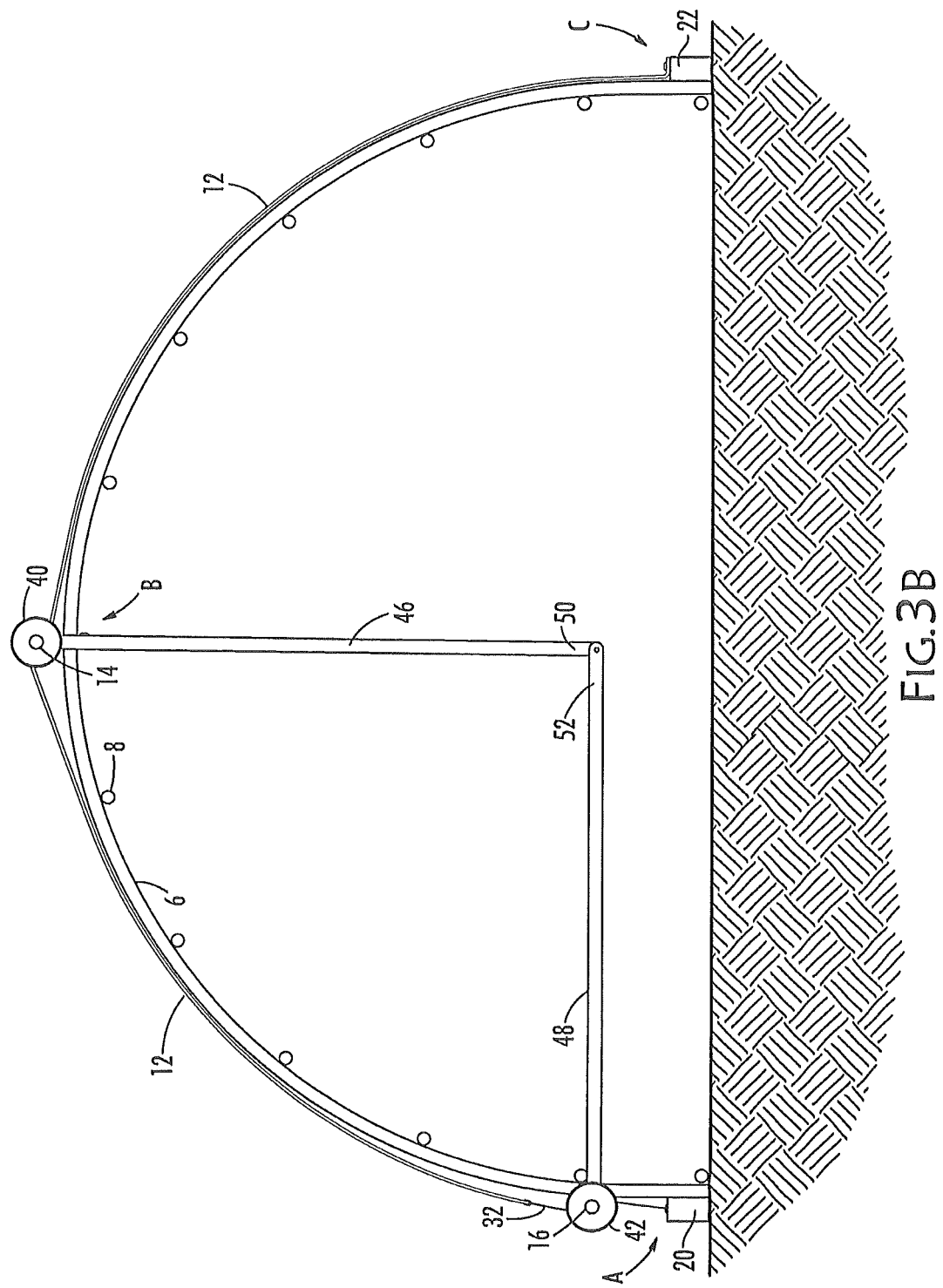

A cold frame according to one embodiment of the present invention is illustrated in FIGS. 1, 2A-C, and 3A and 3B. Cold frame 2 is constructed to form a simple framework 4 of bowed members 6, purlins 8, and sometimes vertical end members (not shown) fastened together. Framework 4 is then covered with plastic cover 12 that can be retracted at the convenience of the user using a retracting device, to be described presently. Note also that three positions A, B, and C, are shown along the arch of the bowed members 6. A is located at a starting base 20, B is the apex, and C is located at a terminal base 22. Starting base 20 and terminal base 22 are stationary supports firmly secured in place to framework 4 on the ground. FIG. 1 shows cold frame 2 in the process of being covered.

The lead edge of the cover may include a marginal portion (not shown) that is not transparent. This marginal portion serves to seal the area along the starting and terminal bases 20, 22, and can be used to protect exposed portions of cover 12 from sun and rain when it is rolled up.

A cover shaft 14 is seen between apex B to the terminal base 22 at C, and a cable shaft 16 is approximately midway between apex B and a starting base 20 at A. Cover 12 has a midline, that is, an imaginary line running perpendicular to the midpoint between a leading edge 26 of cover 12 and a trailing edge 28 of cover 12. Cover 12 is attached at its midline to cover shaft 14. Rotating cover shaft 14 wraps cover 12 around shaft 14 in a double spiral as both the forward half and the trailing half of cover 12 are wound around cover shaft 14 simultaneously and quickly. Trailing edge 28 of cover 12 remains firmly attached to terminal base 22 so that cover shaft 14 is pulled toward terminal base 22 as cover shaft 14 winds up cover 12.

Plural cables 32 are used to pull on leading edge 26 of cover 12 from points along starting base 20, A first end 34 of each cable 32 is attached to starting base 20 and a second end 36 of each cable 32 is attached to leading edge 26 of cover 12. The midpoint of each cable 32 is attached to cable shaft 16 preferably by using a split collar coupling 38 which will hold cable securely in position and allow cover 12 to glide over it easily without catching, binding or tearing. As cable shaft 16 is rotated in one direction, it will wind each cable 32 around cable shaft 16, pulling both leading edge 26 of cover 12 toward cable shaft 16 and pulling itself toward stationary starting base 20. When rotated in the opposite direction and with cover shaft 14 simultaneously rolling up cover 12, second end 36 of each cable 32 will follow the movement of cover 12 toward cover shaft 12, and cover shaft 14 will move toward terminal base 22. As an alternative to or in conjunction with cables 32 and 36, sheet materials, including mesh, cloth, and netting materials, may be used with cable shaft 16 to pull the leading edge 26 over cold frame 2. For example, shade cloth, bird netting, or hail netting may be used, which material then covers the cold frame 2 when the cover 12 is retracted.

As the user continues to cause cover 12 to be retracted from cold frame 2 in FIG. 1, cable shaft 16 continues to travel over bowed members 4 from starting base 20 at location A toward apex B. Meanwhile, cover shaft 14 has traveled from apex B down to terminal base 22 at location C, at which point cold frame 2 will be entirely uncovered.

Rotation of cover shaft 14 and cable shaft 16 may be accomplished using any suitable motor for a shaft drive, such as an electric motor, a pneumatic motor or a hydraulic motor. If an electric motor is used, it may be 24 VDC 80 or 150 watt motor and may be a wirelessly controlled motor. Referring to the figures, a first drive motor 40 is connected to the end of cover shaft 14 and a second drive motor 42 is connected to the end of cable shaft 16. A first drive motor torque arm 46 is connected to first drive motor 40 and a second drive motor torque arm 48 is connected to second drive motor 42 and the ends 50, 52, respectively of first and second drive motor torque arms 46, 48, are pivotally connected together. First and second drive motor torque arms 46, 48, help fix first and second drive motors 40, 42, so they do not rotate with cover shaft 14 and cable shaft 16, as they wind up or unwind cover 12 and cables 32, respectively. First and second drive motor torque arms 46, 48, simply track the movements of first and second drive motors 40, 42.

Cords 58 may be used to keep cover 12 secure to framework 4 when the wind blows. The covering and uncovering of cover 12 takes place between cords above the cover and the bowed members 6 and purlins 8 of framework 4 below cover 12.

Because the plastic cover of a traditional greenhouse is constantly exposed to sunlight with the attendant heat and ultraviolet light, it tends to degrade quickly. With the present system, and the ease and speed with which cover 12 can be retracted, a typical 100 micrometer (4 mil) thick sheet of polyethylene may last as long as four years instead of one year and a 150 micrometers (6 mil) thick sheet of polyethylene may last more than a decade instead of four years. Because covers may last much longer, it may become economical to use specialized covers selected for various purposes such as spectral limitations.

Those skilled in the art of cold frame and cold frame covering construction will recognize that many substitutions and modifications can be made in the foregoing preferred embodiments without departing from the spirit and scope of the present invention.

What is claimed is:

1. A device for covering a cold frame, said cold frame including a starting base, a terminal base spaced apart from said starting base, at least two bowed members and at least two purlins holding said at least two bowed members in spaced-apart, aligned relation between said starting base and said terminal base and forming an apex defined by a midpoint between said starting base and said terminal base, said device comprising:
    (a) a cover dimensioned to run from said starting base to said terminal base and between said first of said at least two bowed members to said second of said at least two bowed members, said cover having a midline, said cover having a leading edge and a terminal edge, said terminal edge of said cover being attached to said terminal base;
    (b) a cover shaft oriented perpendicular to said at least two bowed members, said cover shaft having a major axis;
    (c) a cable shaft oriented perpendicular to said at least two bowed members, said cable shaft having a major axis;
    (d) a first drive motor coupled to said cover shaft and adapted to rotate said cover shaft about said major axis of said cover shaft;
    (e) a second drive motor coupled to said cable shaft and adapted to rotate said cable shaft about said major axis of said cable shaft; and
    (f) at least two cables, each cable of said at least two cables having a first end, a second end and a mid-point, said mid-point of said each cable being attached to said cable shaft, said first end of said each cable being attached to said starting base, and said second end of said each cable being attached to said leading edge of said cover.

2. The device as recited in claim 1, further comprising a first drive motor torque arm having a proximal end and a distal end, and a second drive motor torque arm having a proximal end and a distal end, said proximal end of said first drive motor torque arm connected to said first drive motor and said proximal end of said second drive motor torque arm connected to said second drive motor, said distal end of said first drive motor torque arm being pivotally connected to said distal end of said second drive motor torque arm.

3. The device as recited in claim 1, further comprising plural split collar couplings, each split collar coupling attaching said midpoint of said each cable to said cable shaft.

4. The device as recited in claim 1 wherein said first drive motor rotates said cover shaft in the same direction said cover shaft moves when moving between said starting base and said terminal base over said apex.

5. The device as recited in claim 1 wherein said first drive motor rotates in the same direction as said second drive motor when covering said cold frame.

6. The device as recited in claim 1 wherein said first and said second drive motors are selected from the group consisting of hydraulic motors, pneumatic motors, and electric motors.

7. The device as recited in claim 1 wherein said cover is a polyethelene sheet at least 100 micrometers thick.

8. The device as recited in claim 1 wherein said cover is a polyethylene sheet at least 150 micrometers thick.

9. A cold frame comprising:
(a) a starting base;
(b) a terminal base spaced apart from said starting base;
(c) at least two bowed members and at least one purlin holding said at least two bowed members in spaced-apart, aligned relation between said starting base and said terminal base and forming an apex defined by a mid-point between said starting base and said terminal base, said device comprising:
(d) a cover dimensioned to run from said starting base to said terminal base and between said first of said at least two bowed members to said second of said at least two bowed members, said cover having a midline, said cover having a leading edge and a terminal edge, said terminal edge of said cover being attached to said terminal base;
(e) a cover shaft oriented perpendicular to said at least two bowed members, said cover shaft having a major axis;
(f) a cable shaft oriented perpendicular to said at least two bowed members, said cable shaft having a major axis;
(g) a first drive motor coupled to said cover shaft and adapted to rotate said cover shaft about said major axis of said cover shaft;
(h) a second drive motor coupled to said cable shaft and adapted to rotate said cable shaft about said major axis of said cable shaft; and
(i) at least two cables, each cable of said at least two cables having a first end, a second end and a mid-point, said mid-point of said each cable being attached to said cable shaft, said first end of said each cable being attached to said starting base, and said second end of said each cable being attached to said leading edge of said cover.

10. The device as recited in claim 9, further comprising a first drive motor torque arm having a proximal end and a distal end, and a second drive motor torque arm having a proximal end and a distal end, said proximal end of said first drive motor torque arm connected to said first drive motor and said proximal end of said second drive motor torque arm connected to said second drive motor, said distal end of said first drive motor torque arm being pivotally connected to said distal end of said second drive motor torque arm.

11. The device as recited in claim 9, further comprising plural split collar couplings, each split collar coupling attaching said midpoint of said each cable to said cable shaft.

12. The device as recited in claim 9 wherein said first drive motor rotates said cover shaft in the same direction said cover shaft moves when moving between said starting base and said terminal base over said apex.

13. The device as recited in claim 9 wherein said first drive motor rotates in the same direction as said second drive motor when covering said cold frame.

14. A cold frame comprising:
(a) a starting base;
(b) a terminal base spaced apart from said starting base;
(c) at least two bowed members and at least one purlin holding said at least two bowed members in spaced-apart, aligned relation between said starting base and said terminal base and forming an apex defined by a mid-point between said starting base and said terminal base, said device comprising:
(d) a cover dimensioned to run from said starting base to said terminal base and between said first of said at least two bowed members to said second of said at least two bowed members, said cover having a midline, said cover having a leading edge and a terminal edge, said terminal edge of said cover being attached to said terminal base;
(e) a cover shaft oriented perpendicular to said at least two bowed members, said cover shaft having a major axis;
(f) a cable shaft oriented perpendicular to said at least two bowed members, said cable shaft having a major axis;
(g) a first drive motor coupled to said cover shaft and adapted to rotate said cover shaft about said major axis of said cover shaft;
(h) a second drive motor coupled to said cable shaft and adapted to rotate said cable shaft about said major axis of said cable shaft;
(i) at least two cables, each cable of said at least two cables having a first end, a second end and a mid-point, said mid-point of said each cable being attached to said cable shaft, said first end of said each cable being attached to said starting base, and said second end of said each cable being attached to said leading edge of said cover;
(j) a first drive motor torque arm having a proximal end and a distal end;
(k) a second drive motor torque arm having a proximal end and a distal end, said proximal end of said first drive motor torque arm connected to said first drive motor and said proximal end of said second drive motor torque arm connected to said second drive motor, said distal end of said first drive motor torque arm being pivotally connected to said distal end of said second drive motor torque arm; and
(l) plural cords running from said starting base to said terminal base over said apex and over said cover.

15. The cold frame as recited in claim 14 wherein said first drive motor rotates said cover shaft in the same direction said cover shaft moves when moving between said starting base and said terminal base over said apex.

16. The cold frame as recited in claim 14 wherein said first drive motor rotates in the same direction as said second drive motor when covering said cold frame.

17. The cold frame as recited in claim 14 wherein said first and said second drive motors are selected from the group consisting of hydraulic motors, pneumatic motors, and electrical motors.

18. The cold frame as recited in claim 14 wherein said cover is a polyethylene sheet at least 100 micrometers thick.

19. The cold frame as recited in claim 14 wherein said cover is a polyethylene sheet at least 150 micrometers thick.

20. The cold frame as recited in claim 14, wherein said cover further comprises a marginal portion for use to seal cold frame along starting base and terminal base.

21. A device for covering a cold frame, said cold frame including a starting base, a terminal base spaced apart from said starting base, at least two bowed members and at least two purlins holding said at least two bowed members in spaced-apart, aligned relation between said starting base and said terminal base and forming an apex defined by a mid-point between said starting base and said terminal base, said device comprising:
(a) a cover dimensioned to run from said starting base to said terminal base and between said first of said at least two bowed members to said second of said at least two bowed members, said cover having a midline, said cover having a leading edge and a terminal edge, said terminal edge being attached to said terminal base;

(b) a cover shaft oriented perpendicular to said at least two bowed members, said cover shaft having a major axis;

(c) a cable shaft oriented perpendicular to said at least two bowed members, said cable shaft having a major axis;

(d) a first drive motor coupled to said cover shaft and adapted to rotate said cover shaft about said major axis of said cover shaft;

(e) a second drive motor coupled to said cable shaft and adapted to rotate said cable shaft about said major axis of said cable shaft; and (f) a sheet, said sheet having a first edge, a second edge, and a mid-point, said mid-point of said sheet being attached to said cable shaft, said first edge of said sheet being attached to said starting base, and said second edge of said sheet being attached to said leading edge of said cover.

\* \* \* \* \*